US012030726B2

(12) United States Patent
Rakowski et al.

(10) Patent No.: US 12,030,726 B2
(45) Date of Patent: Jul. 9, 2024

(54) MULTI-ROLLER GUIDE

(71) Applicant: Patz Corporation, Pound, WI (US)

(72) Inventors: Gregory A. Rakowski, Coleman, WI (US); Bradley J. Bedord, Suamico, WI (US); Daniel J. Johnston, Porterfield, WI (US)

(73) Assignee: Patz Corporation, Pound, WI (US)

( * ) Notice: Subject to any disclaimer, the term of this patent is extended or adjusted under 35 U.S.C. 154(b) by 0 days.

(21) Appl. No.: 18/493,513

(22) Filed: Oct. 24, 2023

(65) Prior Publication Data

US 2024/0076135 A1 Mar. 7, 2024

Related U.S. Application Data

(63) Continuation of application No. 17/450,722, filed on Oct. 13, 2021, now Pat. No. 11,807,463.

(60) Provisional application No. 63/093,456, filed on Oct. 19, 2020.

(51) Int. Cl.
| | |
|---|---|
| *B65G 13/08* | (2006.01) |
| *A47L 11/24* | (2006.01) |
| *B65G 13/11* | (2006.01) |
| *B65G 19/04* | (2006.01) |
| *B65G 39/12* | (2006.01) |
| *B65G 45/10* | (2006.01) |
| *A47L 11/40* | (2006.01) |

(52) U.S. Cl.
CPC .............. *B65G 39/12* (2013.01); *A47L 11/24* (2013.01); *B65G 19/04* (2013.01); *B65G 45/10* (2013.01); *A47L 11/4069* (2013.01)

(58) Field of Classification Search
CPC ........ B65G 13/08; B65G 13/11; B65G 19/04; B65G 39/12; B65G 45/10; A47L 11/24
USPC .................. 193/35 R; 198/618, 813; 15/93.1
See application file for complete search history.

(56) References Cited

U.S. PATENT DOCUMENTS

| | | | |
|---|---|---|---|
| 3,223,664 A | 12/1965 | Conlon | |
| 3,860,109 A | 1/1975 | Benzmiller | |
| 4,243,137 A | 1/1981 | Laurenz | |
| 4,354,593 A | 10/1982 | Diedrich | |
| 5,072,819 A * | 12/1991 | Yamada | ................... B23Q 7/05 198/780 |
| 5,620,601 A * | 4/1997 | Wilcher | ............... B01D 21/245 198/721 |
| 7,401,575 B2 * | 7/2008 | Waybright | ........... A01K 1/0132 119/451 |

(Continued)

*Primary Examiner* — Douglas A Hess
(74) *Attorney, Agent, or Firm* — James A. Joyce; Godfrey & Kahn, S.C.

(57) ABSTRACT

A multi-roller guide that includes a base plate, a cover plate, a plurality of spacers positioned perpendicularly between the base plate and cover plate, a plurality of spacer fasteners coupled to the spacers, and a plurality of roller assemblies secured between the base plate and cover plate and aligned along a roller assembly arc path. Each roller assembly includes a roller coupled to a roller bearing, with the roller bearing having a bearing center passage that receives therein an axle, and wherein the plurality of roller assemblies are secured between the cover plate and base plate via the axle, and wherein each roller is spool shaped including a core portion connecting upper and lower boundary walls, the upper and lower boundary walls extending radially outward from the core portion and including a space therebetween for receiving a portion of a tensile member.

17 Claims, 17 Drawing Sheets

(56) References Cited

U.S. PATENT DOCUMENTS

| | | | |
|---|---|---|---|
| 9,115,787 B2 * | 8/2015 | Kato | F16C 33/6659 |
| 9,284,126 B2 * | 3/2016 | Pellman | B65G 19/04 |
| 9,429,216 B2 * | 8/2016 | Kato | F16H 7/12 |
| 9,464,699 B2 * | 10/2016 | Kato | F16C 13/006 |
| 9,909,652 B2 * | 3/2018 | Kato | F16H 7/08 |
| 10,774,550 B2 * | 9/2020 | Anderson | E04G 23/006 |
| 11,161,313 B2 * | 11/2021 | Pan | B29D 30/08 |
| 11,821,495 B2 * | 11/2023 | Bedord | B65G 19/18 |
| 2004/0261205 A1 | 12/2004 | Berg | |

\* cited by examiner

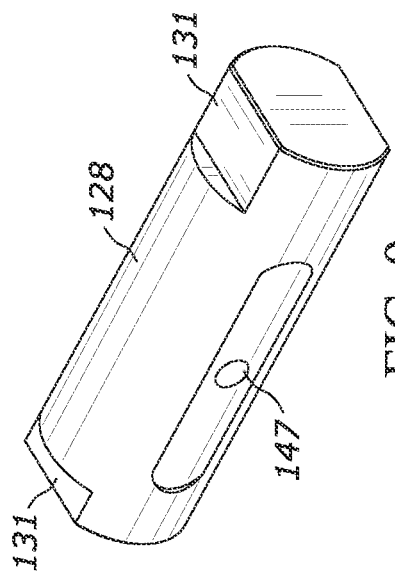
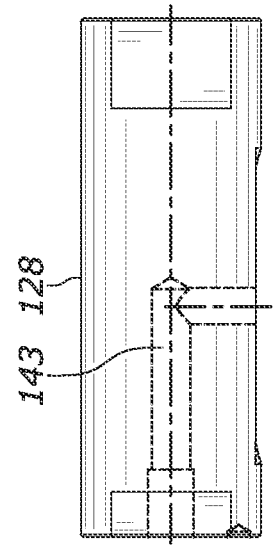
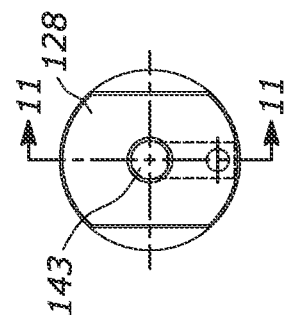
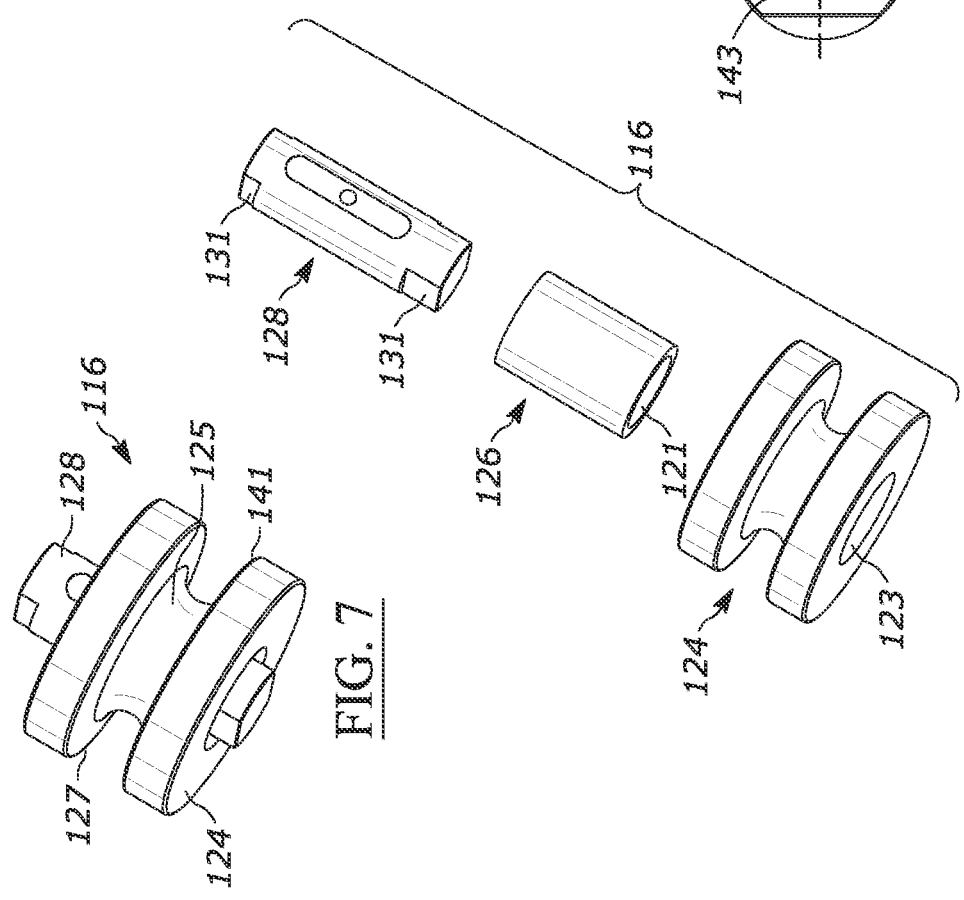

MULTI-ROLLER GUIDE

CROSS-REFERENCE TO RELATED APPLICATION

This application claims priority to and is a continuation of U.S. Non-Provisional patent application Ser. No. 17/450,722 filed on Oct. 13, 2021, which also claims priority to U.S. Provisional Patent Appl. No. 63/093,456 filed on Oct. 19, 2020, the disclosures of which are both incorporated herein by reference in their entirety for all purposes.

FIELD OF THE INVENTION

The invention relates generally to the field of floor cleaning systems. More particularly, the invention relates to a guide for a floor cleaning system.

BACKGROUND

Floor cleaning systems, such as barn alley scrapers, and other shuttling circuits are commonly used to move animal waste and other debris out of an alley and into debris channels. Many such systems include a circuit formed by one or more shuttled scrapers connected to a motor via chain, wire rope, or braided rope (i.e., tensile member). Activation of the motor causes the scrapers to move along a chosen path that leads to one or more debris channels. The circuit generally includes several guides to change direction of the tensile member, often forming a rectangular or other loop-shaped configuration. Known guides utilize a single roller disk design that receives the tensile member and guides it around the corner. Such designs have many shortcomings that can result in stress and fatigue on the tensile member, as well as the whole system.

More particularly, when the tensile member is a chain, wear becomes troublesome due to the fact that many links are strung together to produce the circuit of chain. Every time the circuit of chain must change direction, the interconnected links slide on one another causing very small amounts of wear on both touching surfaces of the interconnected links. This small wear is amplified by the number of links in the circuit, for example, if there is 2,000 feet of chain with each link having a pitch length of 1.5" there is 16,000 connection points of wear. If each connection point wears 0.005" the circuit "slack" created would equal 80". This is problematic as this circuit slack must be "taken-up" to maintain proper tension to do the work. The smaller (i.e. tighter) the bending radius at each guide, the more wear is created due to the larger degree of relative movement between the two interconnected links to perform the direction change. More wear equals, more take-up required at a faster rate, which means decreased chain life, decreased chain strength, and increased maintenance.

When the tensile member is wire rope, cable, or braided rope, wear is created by a tight (i.e. small) bend radius provided by the known single roller design. Utilizing a tight bend radius greatly increases the internal and surface stresses of this type of tensile member which in turn causes surface wear and reduction of service life. When using larger single roller designs the theoretical internal stresses can be reduced by a larger bend radius, but surface stresses on the tensile member greatly increase during conditions of sliding of the tensile member across the roller when the roller does not rotate as freely due to its increased size and added friction.

It will be understood by those skilled in the art that one or more aspects of this invention can meet certain objectives, while one or more other aspects can lead to certain other objectives. Various objects, features, benefits and advantages of the invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

In at least some embodiments, a multi-roller guide is provided that includes: a base plate; a cover plate secured to the base plate; a plurality of roller assemblies including rollers rotatably secured between the base plate and cover plate, and aligned along a roller assembly arc path, wherein the rollers are configured to rotatably engage with a tensile member; and a plurality of spacers secured between the base plate and cover plate.

In at least some other embodiments, a floor cleaning system is provided having a circuit that includes a tensile member and a floor scraper, and a plurality of multi-roller guides, the system including: a plurality of multi-roller guides, each multi-roller guide comprising: a base plate; a cover plate secured to the base plate; and a plurality of roller assemblies including rollers rotatably secured between the base plate and cover plate, and aligned along a roller assembly arc path, wherein the rollers are configured to rotatably engage with the tensile member to effectuate a change in direction of the tensile member; and a drive motor assembly for moving the tensile member and the floor scraper within the circuit.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in application to the details of construction or the arrangement of the components illustrated in the drawings. The invention is capable of other embodiments or of being practiced or carried out in other various ways.

FIG. 7 is a perspective view of an exemplary roller assembly of FIG. 3.

FIG. 8 is an exploded perspective view of the roller assembly.

FIG. 9 is a perspective view of an exemplary axle of FIG. 3.

FIG. 10 is a top view of the axle.

FIG. 11 is a cross-sectional view of the axle taken along line 11-11 of FIG. 10.

DETAILED DESCRIPTION

Figure 1:
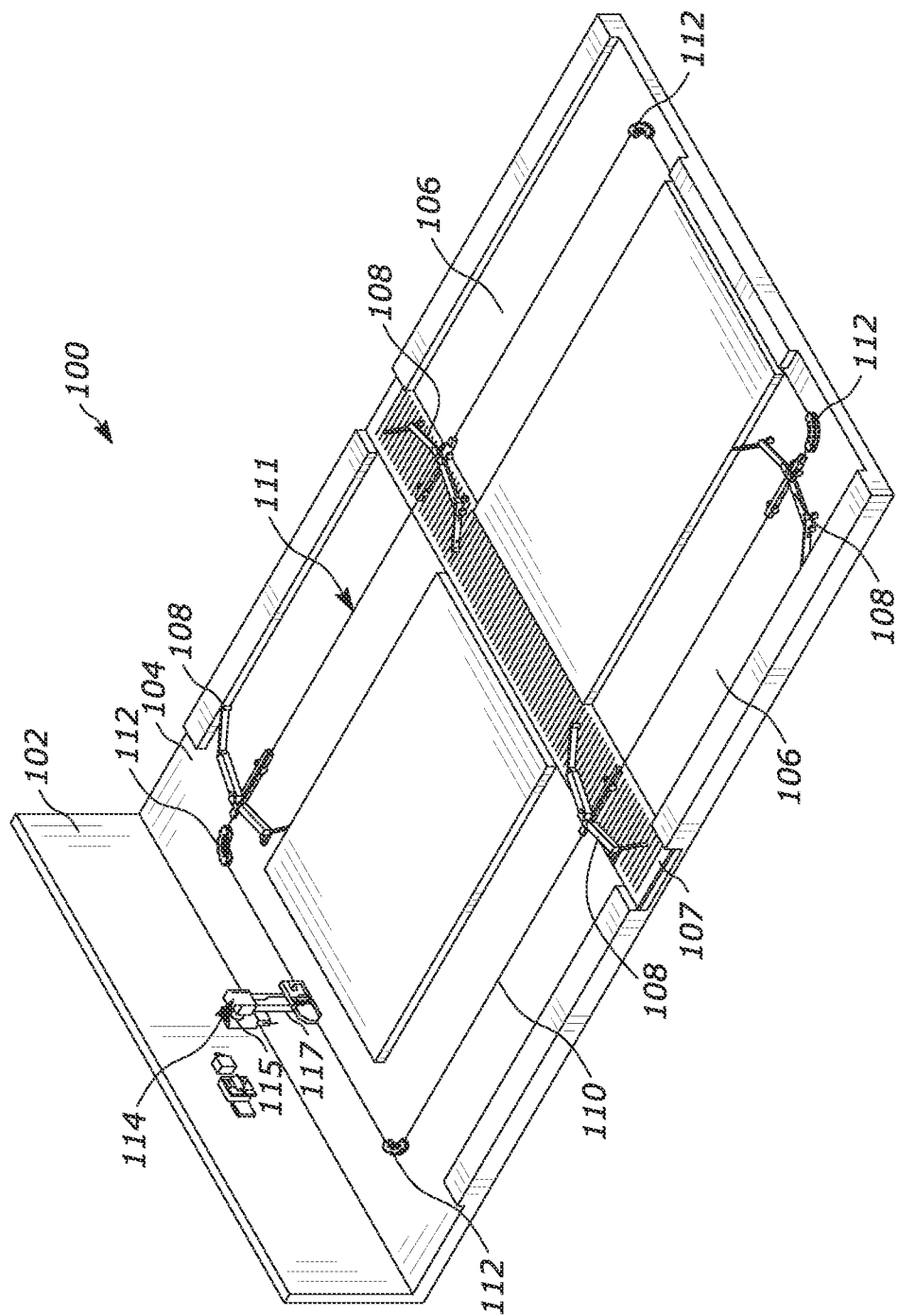
FIG. 1 is a top perspective view of an exemplary floor cleaning system positioned relative to an exemplary barn floor and wall.
Figure 2:
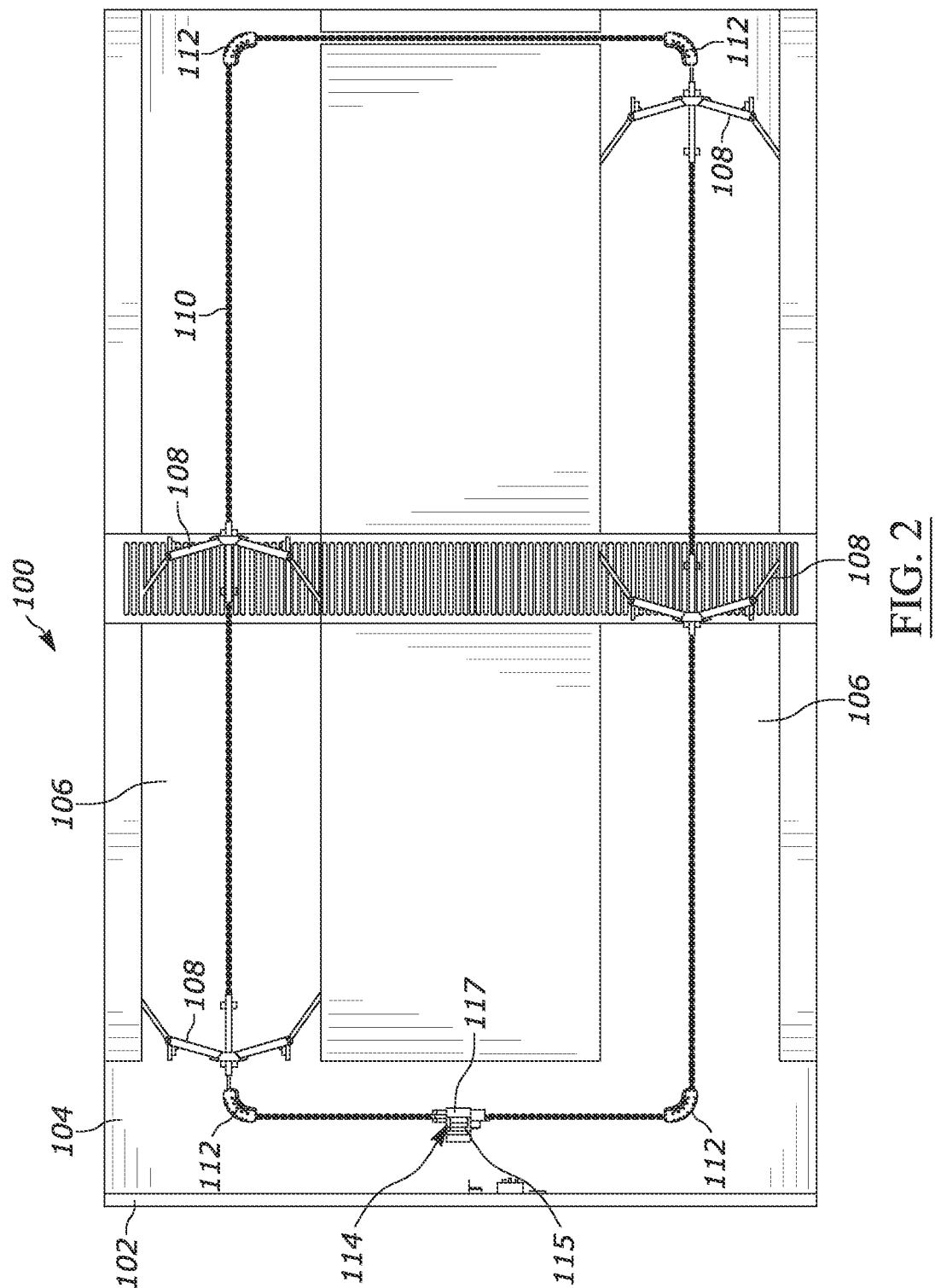
FIG. 2 is a top view of the floor cleaning system shown in FIG. 1.
Figure 3:
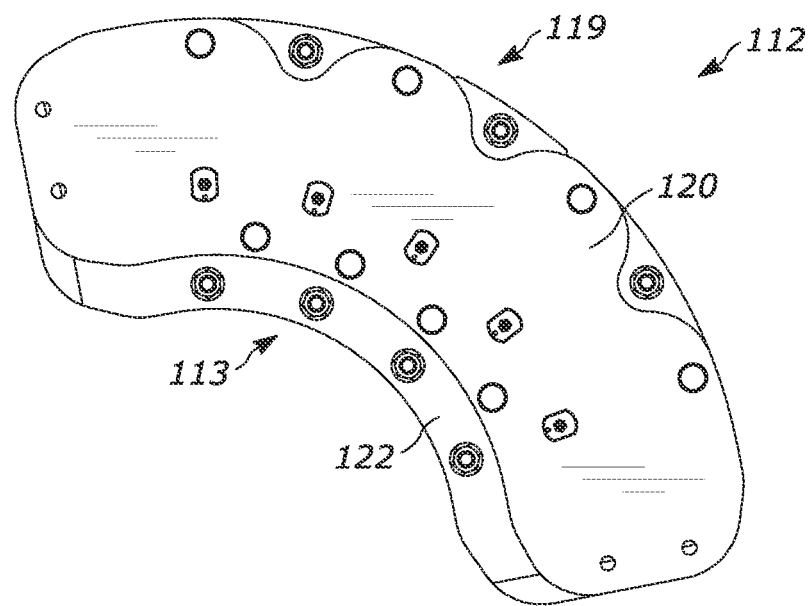
FIG. 3 is a front view of an exemplary multi-roller guide.
Figure 4:
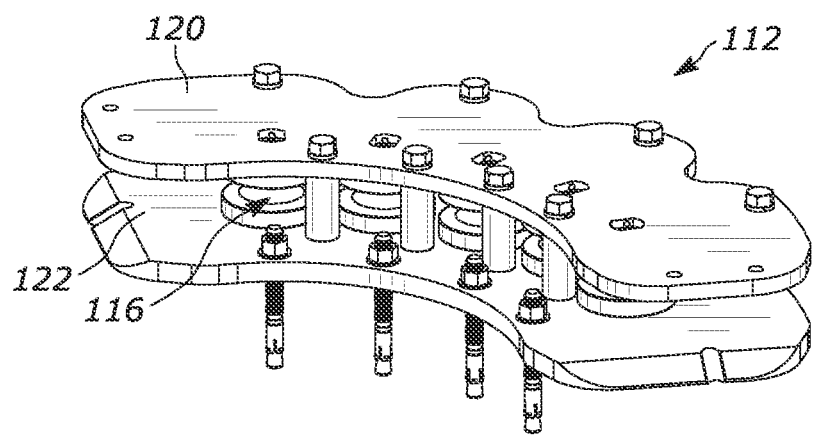
FIG. 4 is a top perspective view of the multi-roller guide.
Figure 5:
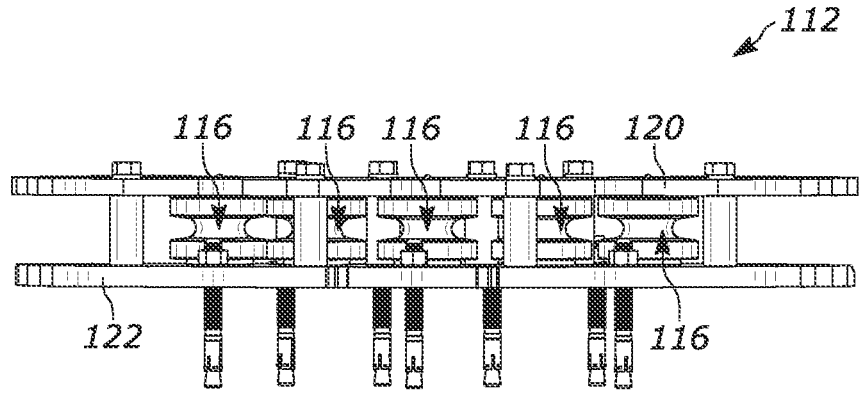
FIG. 5 is a rear view of the multi-roller guide.
Figure 6:
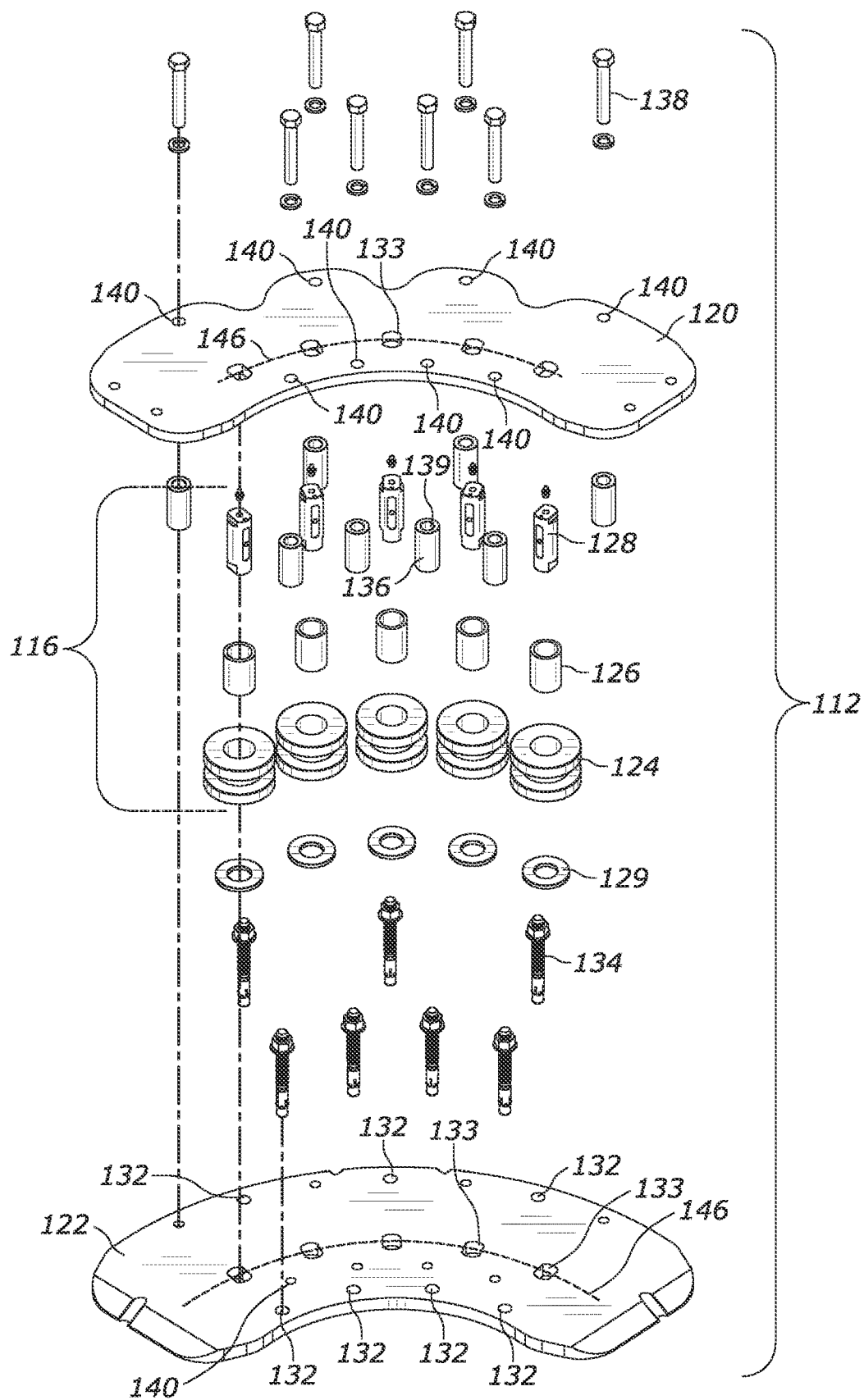
FIG. 6 is an exploded front perspective view of the multi-roller guide.

FIGS. 1 and 2 illustrate an exemplary floor cleaning system 100 shown positioned relative to a wall 102 and a floor 104. The wall 102 and floor 104 are exemplary and are for illustrative purposes to show the layout of an exemplary configuration. As shown in FIGS. 1 and 2, the floor 104 includes two exemplary longitudinal parallel alleys 106, each having a pair of floor scrapers 108 coupled within the recessed alley 106 and positioned to direct debris into a further recessed debris channel 107. The scrapers 108 are further coupled by a tensile member 110 to form a complete circuit 111 (i.e., a loop of connections).

The tensile member 110 can include various individual lengths (e.g., coupled between scrapers 108, etc.) or a continuous loop coupled to the scrapers 108. For simplicity, the term tensile member 110 can refer to either configuration. Further, the tensile member 110 can take many forms such as a chain, a rope, a belt, a cable, etc. A plurality of multi-roller guides 112 are provided at the corners to change the direction of the tensile member 110 accordingly. The multi-roller guides 112 are secured in position (e.g., to the floor 104) and unlike the scrapers 108, in at least some embodiments, remain anchored in place during operation of the floor cleaning system 100. The tensile member 110 is fixedly secured to the scrapers 108 and rotatably engaged with the multi-roller guides 112, such that tensile member 110 is allowed to pass through the guides 112. The tensile member 110 is further engaged with a drive motor assembly 114 that causes the tensile member 110 to rotate within the circuit 111.

The drive motor assembly 114 can in at least some embodiments incorporate a drive motor 115 to provide a motive force to the tensile member 110. A chain tensioner 117 can also be incorporated in the drive motor assembly 114 to maintain or adjust tension. When the drive motor assembly 114 is activated to move the tensile member 110, the scrapers 108 are moved along the alleys to push waste and debris. As the floor cleaning system 100 shown in FIGS. 1 and 2 is exemplary, it shall be understood that the quantity and positioning of various components, such as the multi-roller guides 112, tensile member 110, scrapers 108, etc. can vary to accommodate a desired circuit shape and configuration.

As shown in FIGS. 3-6 providing top, front perspective, rear, and front exploded views, in at least some embodiments, the exemplary multi-roller guide 112 is generally arc-shaped and includes a plurality of roller assemblies 116, while in other embodiments, the exemplary multi-roller guide 112 can take other shapes. In at least some embodiments, two roller assemblies 116 are provided, while in other embodiments, three or more roller assemblies 116 are provided to form a generally arc-shaped configuration (e.g., a roller assembly arc path 146). In at least some embodiments, the roller assemblies 116 are secured between a cover plate 120 and a base plate 122. As shown, the cover plate 120 and the base plate 122 can be generally arc-shaped, although other shapes can be utilized. The multi-roller guide 112 has a guide front 113 that would be situated in front of the tensile member 110 and a guide rear 119, that would be situated behind the tensile member 110.

Referring to FIGS. 7 and 8, in at least some embodiments, each roller assembly 116 can include a roller 124 having a roller center passage 123 that receives a bearing 126, with the bearing 126 having a bearing center passage 121 that receives therein an axle 128, wherein the roller assembly 116 is secured between the cover plate 120 and base plate 122 via the axle 128. In some other embodiments, the roller assemblies 116 can be comprised of other components and secured in other manners. In at least some embodiments, the roller 124 can be spool shaped and include a core portion 125 extending between upper and lower boundary walls 127, 141, and in some embodiments, the roller 124 can include sprocket-like tooth profiles configured to engage the tensile member 110.

The bearing 126 can be comprised of one or more of various materials, such as nylon, brass, steel, etc., and can take any of various forms, such as a roller bearing, a taper bearing, etc. and include various shapes, such as cylindrical. In at least some embodiments, a thrust washer 129 (FIG. 6) can be provided between the roller assembly 116 and the base plate 122 and/or cover plate 120 to space the roller 124 and bearing 126 from either plate.

As seen in FIGS. 9-11 illustrating perspective, top, and cross-sectional views of the axle 128, in at least some embodiments, the axle 128 is generally cylindrical, and can further include a lubrication passage 143. The axles 128 can be fixed to the base plate 122 and the cover plate 120 using fasteners, such as screws, bolts, etc., in addition, in at least some embodiments, the axles 128 can include anti-rotation non-round ends 131, shaped to engage with mating apertures 133 on the base plate 122 and cover plate 120. Further, although in the illustrated embodiment, the axle 128 is not configured to rotate, in at least some embodiments of the roller assembly 116, the roller 124 can be fixed to the axle 128, with the axle 128 freely rotatable about one or more bearings within the base plate 122 and cover plate 120.

Figure 12:
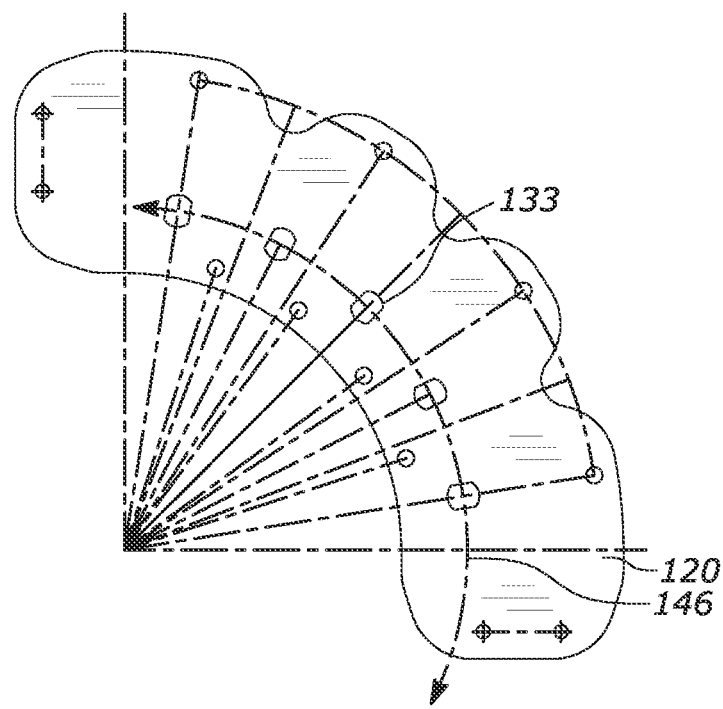
FIG. 12 is a top view of an exemplary cover plate.
Figure 13:
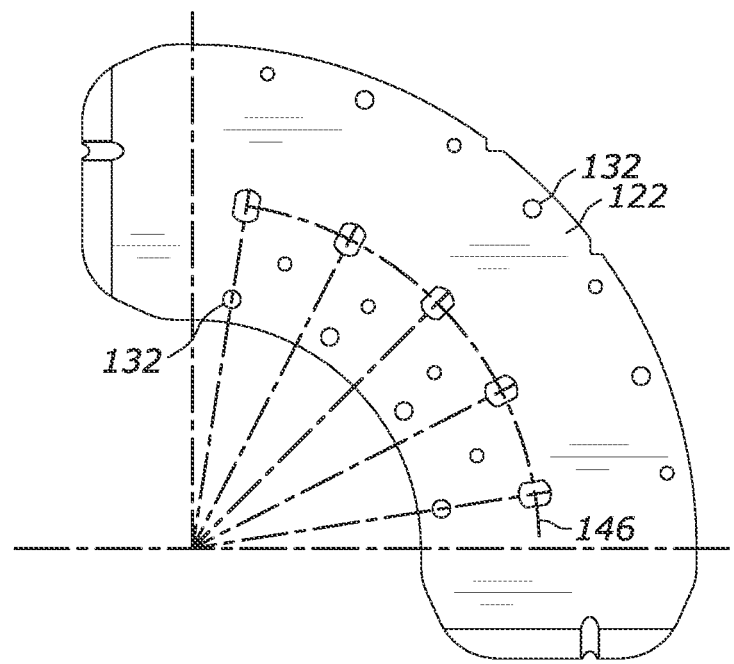
FIG. 13 is a top view of an exemplary base plate.

Referring to FIG. 12, a top view of the cover plate 120 is provided. In at least some embodiments, the cover plate 120 includes a plurality of the aforementioned mating apertures 133, as does the base plate 122 shown in FIG. 13. The base plate 122 can further include a plurality of base securement apertures 132 for receiving base plate fasteners 134 (e.g., bolts, bolts with nuts, etc.) (see FIG. 6) for securement of the multi-roller guide 112 to a surface, such as the floor 104 at a desired corner (or other change of direction in any plane) location. As seen best in FIG. 6, the multi-roller guide 112 can further include a plurality of spacers 136 situated between the base plate 122 and cover plate 120 to provide clearance for the rollers 124 and the tensile member 110 between the base plate 122 and cover plate 120. In at least some embodiments, the spacers 136 are cylindrical, although in other embodiments, other shapes can be provided. In addition, the spacers 136 can be shaped, sized, and/or positioned, to rub off debris (manure, bedding, dirt, sand, hay, etc.) collected on the tensile member 110 during operation, which improves the ability of the roller assemblies 116 to effectively operate. Further, in at least some embodiments, the spacers 136 are secured between the cover plate 120 and base plate 122 using a plurality of spacer fasteners 138 (see FIG. 6) that pass through spacer passages 139 in the spacers 136, and spacer apertures 140 in the cover plate 120. The spacer fasteners 138 can include any of numerous types of fasteners, such as bolt and nut combinations, or bolts for coupling with threads in the base plate 122 or cover plate 120.

Figure 14:
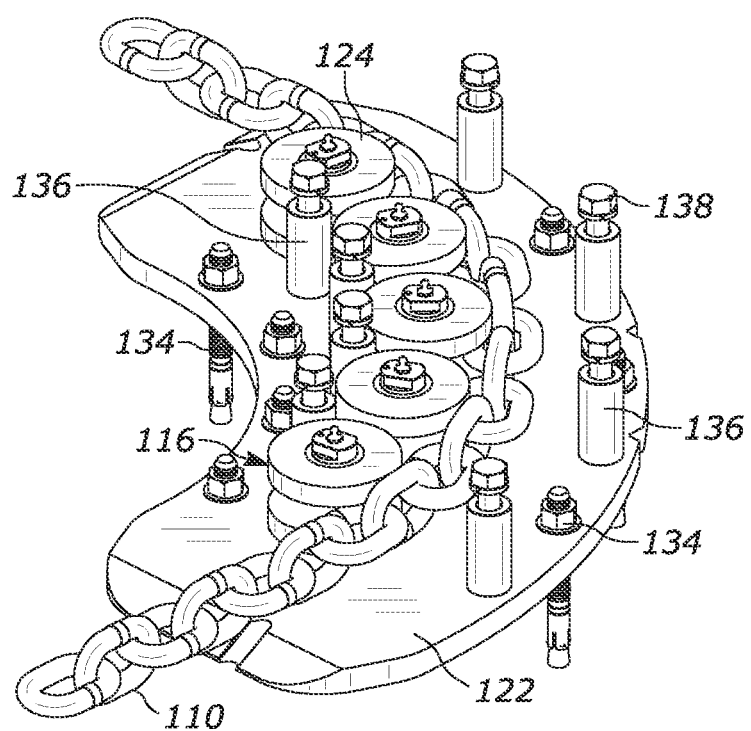
FIG. 14 is a top perspective view of the multi-roller guide with the cover plate removed and a tensile member shown engaged therewith.
Figure 15:
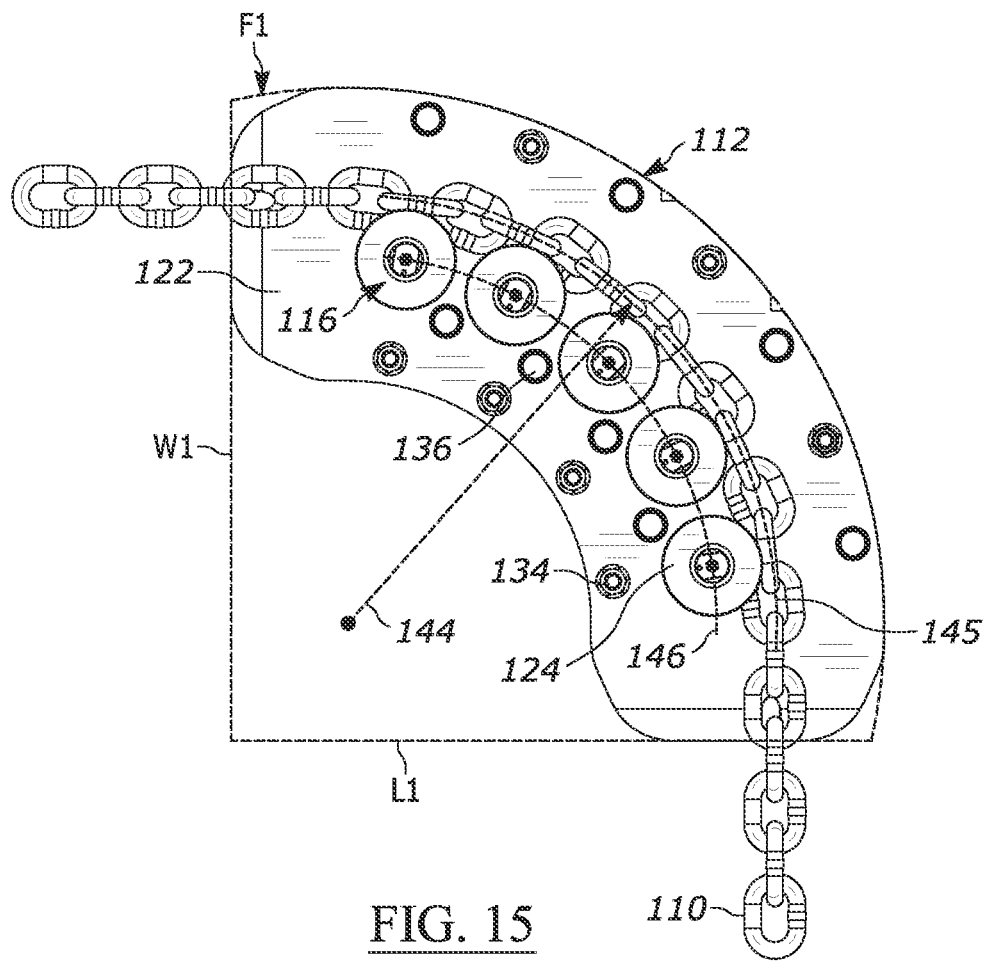
FIG. 15 is a top view of the multi-roller guide with the cover plate removed and a tensile member shown engaged therewith.

As noted above, the multi-roller guide 112 can be utilized in a floor clearing system 100 to provide corner bend or other change in directions for the tensile member 110. Referring to FIGS. 14 and 15 illustrated are perspective and top views of the multi-roller guide 112 with the cover plate 120 removed and the tensile member 110 shown engaged therewith. The cover plate 120 is omitted to provide an enhanced view of the tensile member 110 (e.g., a chain) engaged with the roller assemblies 116, as well as a guide bend radius 144, a tensile member arc path 145, and the roller assembly arc path 146. When under tension, the tensile member 110 abuts the core portion 125 and/or outer upper and lower boundary walls 127, 141 of the roller 124. As the drive motor assembly 114 rotates the tensile member 110 about the circuit 111 (to move the tethered scraper 108 and/or other devices), the rollers 124 rotate in abutment with the tensile member 110 to guide the tensile member 110 along the guide bend radius 144. The roller assembly arc path 146 illustrates an exemplary arc path that can be utilized in some embodiments, while in other embodiments, the roller assemblies 116 can be positioned such that the roller assembly arc path has more or less bend (i.e., arc size) as desired to provide an alternate tensile member arc path. The multi-roller guide 112 can be used in any section of a driven or non-driven circuit 111 to redirect the tensile member 110 as desired.

As discussed above, the multi-roller guide 112 provides among other things, the ability to redirect a tensile member without requiring a significant footprint or significant weight causing drag on the circuit. Referring to prior art FIG. 16, a known guide 200 is shown that utilizes a single disk 202 engaged with a chain 204. The disk 202 has a bend radius 206 and chain arc path 207, both of which are limited by the diameter of the disk 202, with the diameter of the disk 202 being limited by the acceptable weight and friction of the disk 202 and space for accommodating the disk 202. Due to the various constraints, a typical bend radius 206 in the 5-6-inch range to accommodate a 90 degree turn of the chain 204 can require an overall footprint of the guide 200 of over 17 inches in length and 17 inches in width. Increasing the bend radius 206 to provide a 12-inch bend radius would require a significantly larger amount of floor space and a much larger heavier disk 202, which further increases the overall system load on a drive motor.

Figure 16:
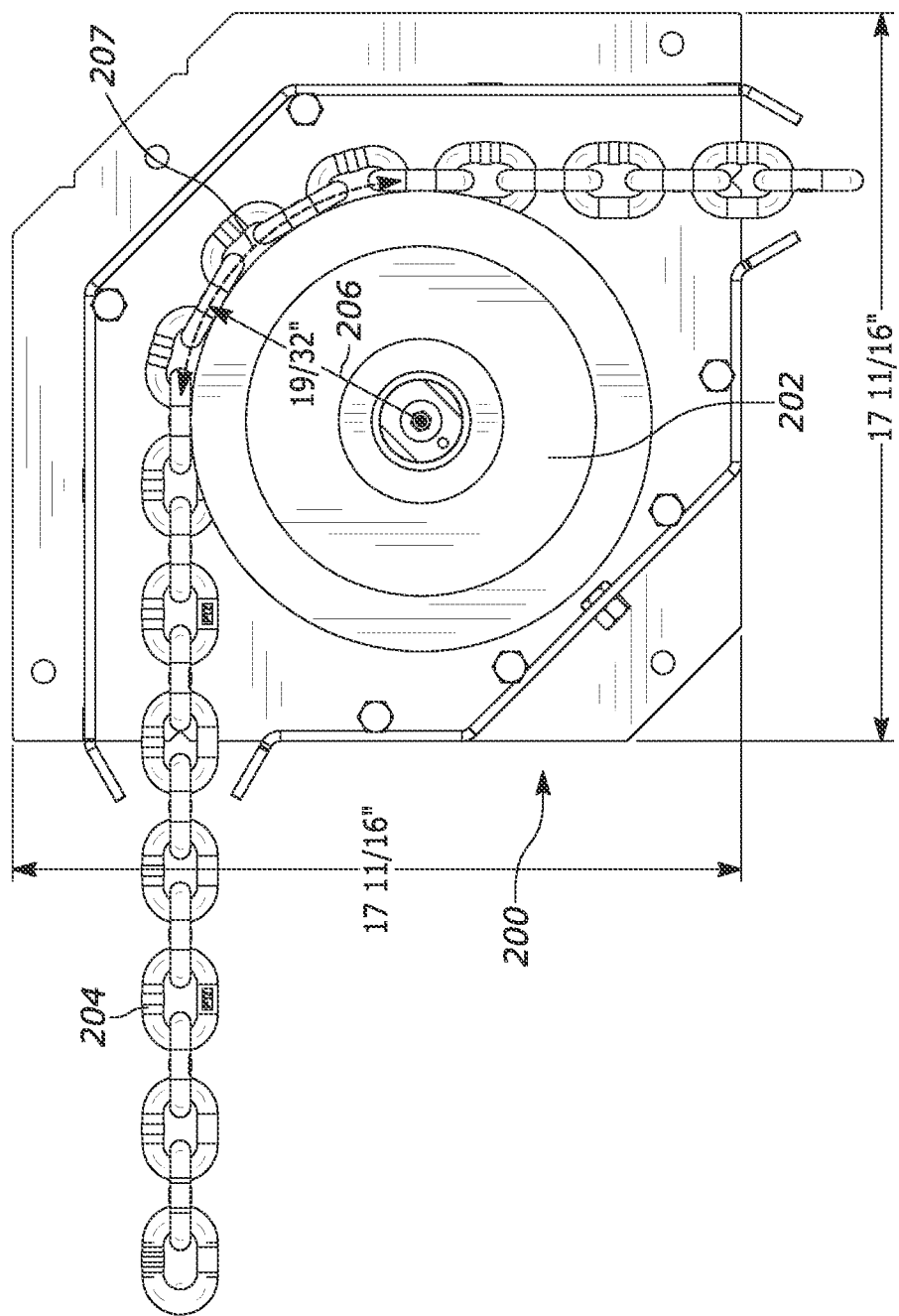
FIG. 16 is a prior art guide shown with a single disk engaged with a chain.

In contrast to the prior art design shown in FIG. 16, the multi-roller guide 112 with multiple roller assemblies 116 distributed along a roller assembly arc path 146, each spinning on multiple axles 128, provides an improved bending radius (i.e., longer radius) that is significantly longer than a traditional roller disk design utilizing a single large disk, but without requiring a significantly larger footprint for mounting the disk. For example, the multi-roller guide 112 can easily provide over a 12-inch guide bend radius 144 without requiring a large heavy disk and associated large mounting space. In addition, the shape of the multi-roller guide 112 is easily accommodated at the corners of a circuit and can be downsized or upsized significantly by increasing the overall scale or adding or removing roller assemblies 116. The larger available bend radius provides less stress on the tensile member 110 and the overall floor cleaning system 100. The guide bend radius 144 is the radius of a circle that would follow the tensile member arc path 145, and in at least some embodiments is between about 12 inches and about 14 inches, while in other embodiments, the guide bend radius 144 is greater than about 14 inches or less than about 12 inches. The curvature of the roller assembly arc path 146 is identical to the curvature of the tensile member arc path 145. In at least some embodiments, with a guide bend radius 144 of 12 inches, the length L1 and width W1 of the footprint F1 of the multi-roller guide 112 (e.g., FIG. 15) is between about 18 inches and about 20 inches.

Figure 17:
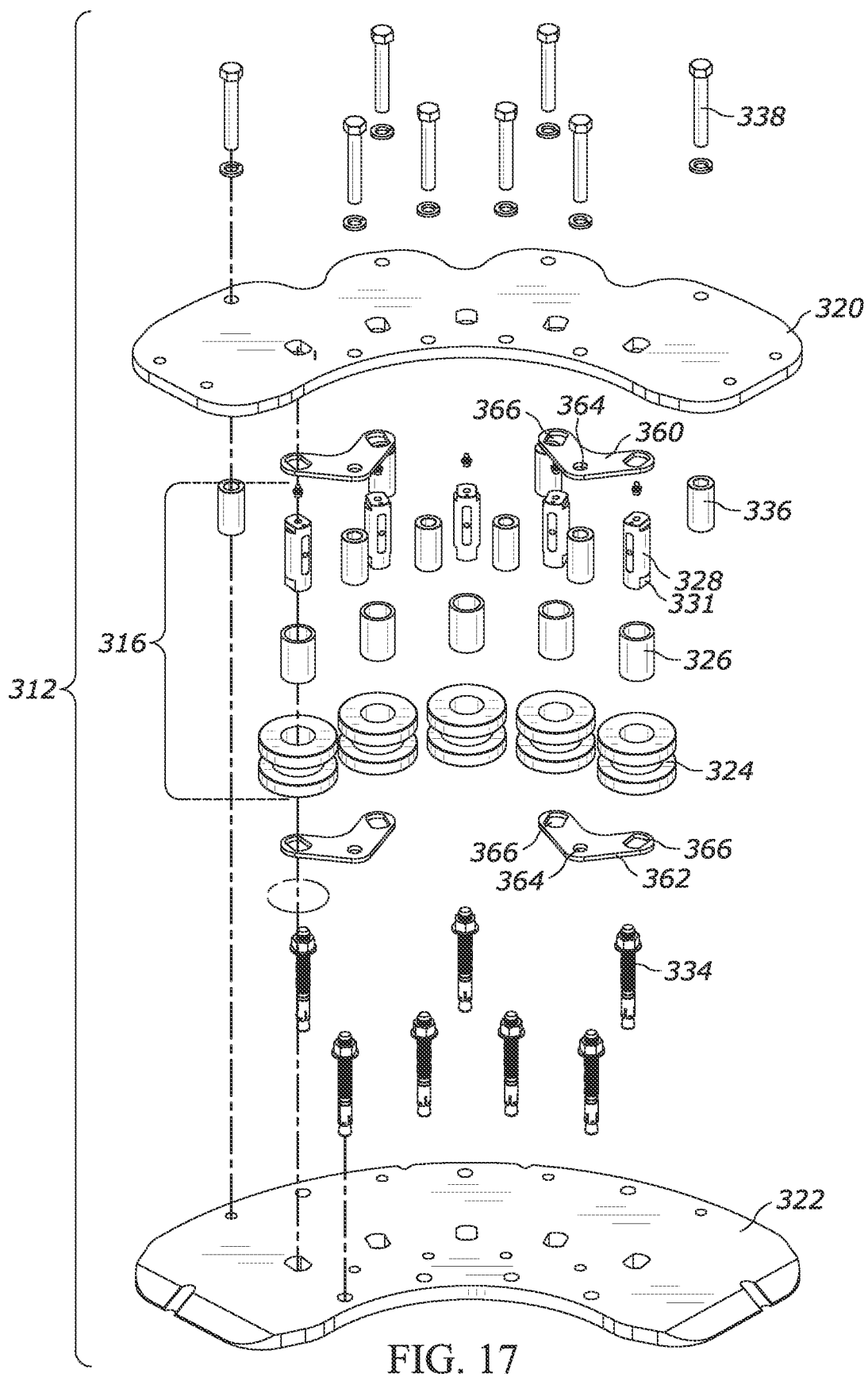
FIG. 17 is an exploded perspective view of an exemplary second embodiment of a multi-roller guide that includes linked roller assemblies.

Referring now to FIG. 17, an exploded perspective view of an exemplary second embodiment of a multi-roller guide 312 that includes a plurality of linked roller assemblies 316 is provided. The multi-roller guide 312 shares many components with the first embodiment of the multi-roller guide 112, as such, for convenience the components have been numbered similarly using a 300-series number in place of the 100-series number (i.e., spacer 136 and spacer 336, etc.) to indicate at least in some embodiments, at least partially similar form and function.

The multi-roller guide 312 includes one or more roller assemblies 316 that are linked to one or more other roller assemblies 316. Linking the roller assemblies 316 can provide improved load sharing, particularly on the roller assemblies 316 situated at the outer ends of the multi-roller guide 312 where maximum loading from the tensile member 110 occurs. The linking can be performed using various configurations, although in at least some embodiments, the linking is performed using an upper link 360 and a lower link 362, each having a centered or offset pivot point 364 and a pair of axle apertures 366 shaped and sized to receive the ends 331 of the axles 328. The pivot points 364 are generally positioned between the cover plate 320 and the base plate 322. In at least some embodiments, the pivot points 364 are pivotably secured along with a spacer 336 therebetween, using spacer fasteners 338 that pass through the spacer apertures 340. The links 360, 362 can be configured in various shapes, such as a "V" shape, straight bar shape, "L" shaped, arced, etc.

In at least some embodiments, the links 360, 362 can be utilized with all the roller assemblies 316, while in other embodiments, some of the roller assemblies 316 can be secured without links 360, 362, such as shown in FIG. 17 where the roller assembly 316 in the center position is unlinked. In at least some other embodiments, the pivot points 364 can be secured similar to the roller assemblies 316 using a bearing 326 and axle 328 configuration instead of a spacer 336, to provide some rotational freedom to the roller assemblies 316.

The bearing 326 can be comprised of one or more of various materials, such as nylon, brass, steel, etc., and can take any of various forms, such as a roller bearing, a taper bearing, etc. and include various shapes, such as cylindrical. In at least some embodiments, a lower thrust washer 329 and an upper thrust washer (not shown) can be provided between the roller assembly 316 and the base plate 322 and cover plate 320 to space the roller 324 and bearing 326 from either plate.

In at least some embodiments, the axle 328 is generally cylindrical, and can further include a lubrication passage 343. The axles 328 can be fixed to the base plate 322 and the cover plate 320 using fasteners, such as screws, bolts, etc., in addition, in at least some embodiments, the axles 328 can include ends 331 shaped to engage with mating apertures 333 on the base plate 322 and cover plate 320 (e.g. non-round).

Figure 18:
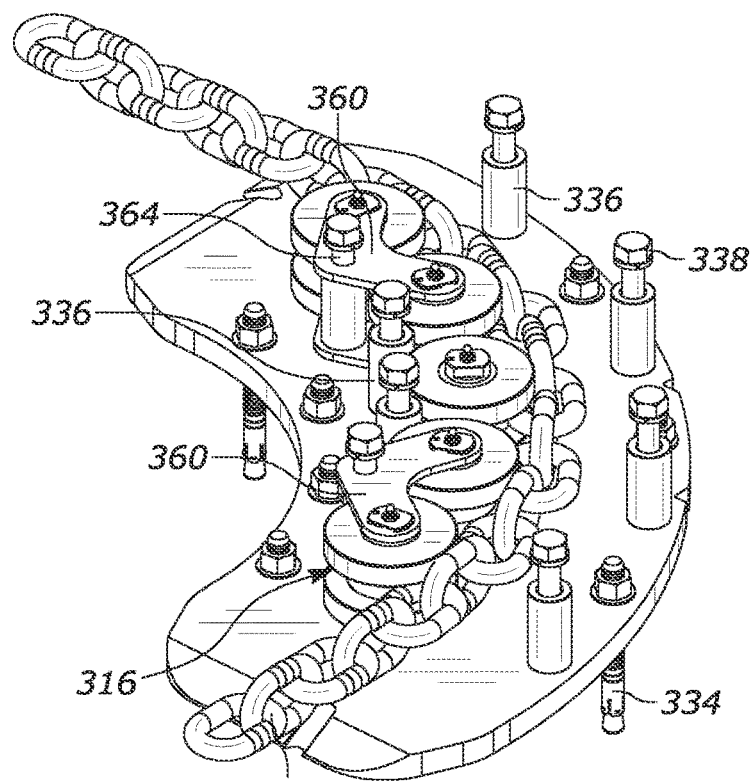
FIG. 18 is a perspective view the second embodiment of the multi-roller guide of FIG. 17 with the cover plate removed and a tensile member shown engaged therewith.
Figure 19:
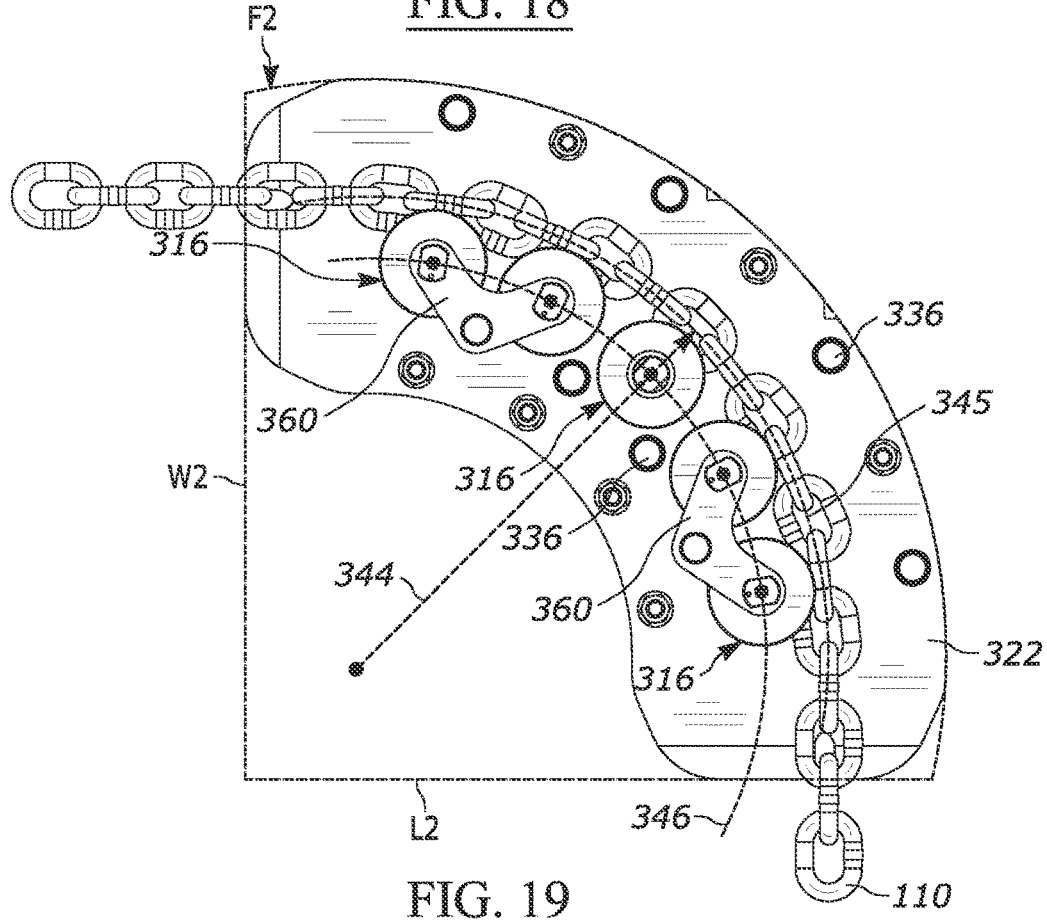
FIG. 19 is a top view of the multi-roller guide shown in FIG. 17 with the cover plate removed and a tensile member shown engaged therewith.

For illustrative purposes, FIGS. 18 and 19 provide perspective and top views of the multi-roller guide 312 of FIG. 17 with the cover plate 320 removed and a tensile member 110 shown engaged therewith. In at least some embodiments, two roller assemblies 316 are provided, while in other embodiments, three or more are provided to form a generally arc-shaped configuration (e.g., a roller assembly arc path 346). In addition, a guide bend radius 344 extends from a tensile member arc path 345, which has the same arc as the roller assembly arc path 346. The guide bend radius 344 is the radius of a circle that would follow the tensile member arc path 345, and in at least some embodiments is between about 12 inches and about 14 inches, while in other embodiments, the guide bend radius 344 is greater than about 14 inches or less than about 12 inches. The length L2 and width W2 of the footprint F2. In at least some embodiments, with a guide bend radius 344 of 12 inches, the length L2 and width W2 of the footprint F2 of the multi-roller guide 312 (e.g., FIG. 19) is between about 18 inches and about 20 inches.

Figure 20:
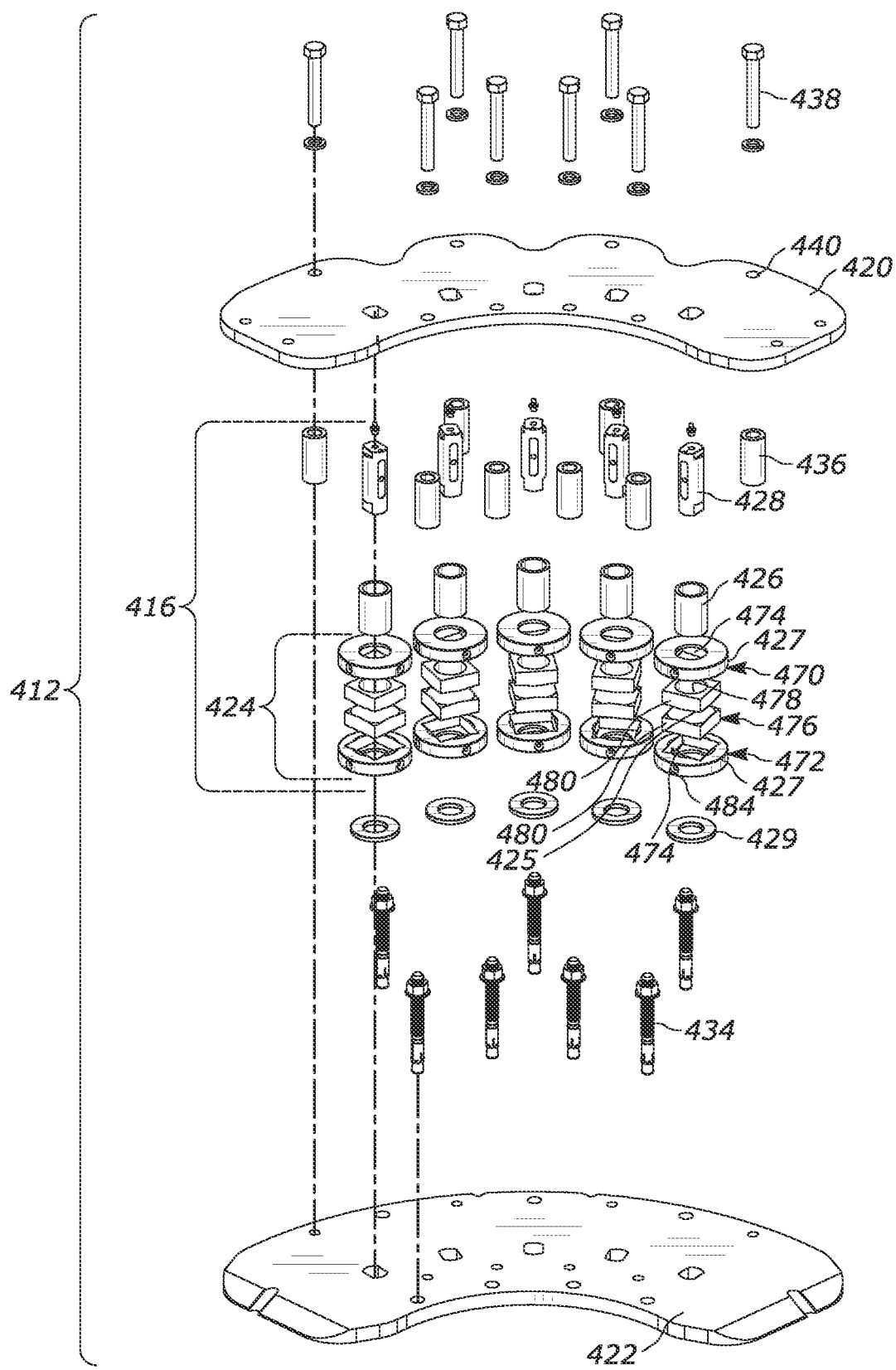
FIG. 20 is an exploded perspective view of an exemplary third embodiment of a multi-roller guide that includes a multi-portion roller.
Figure 21:
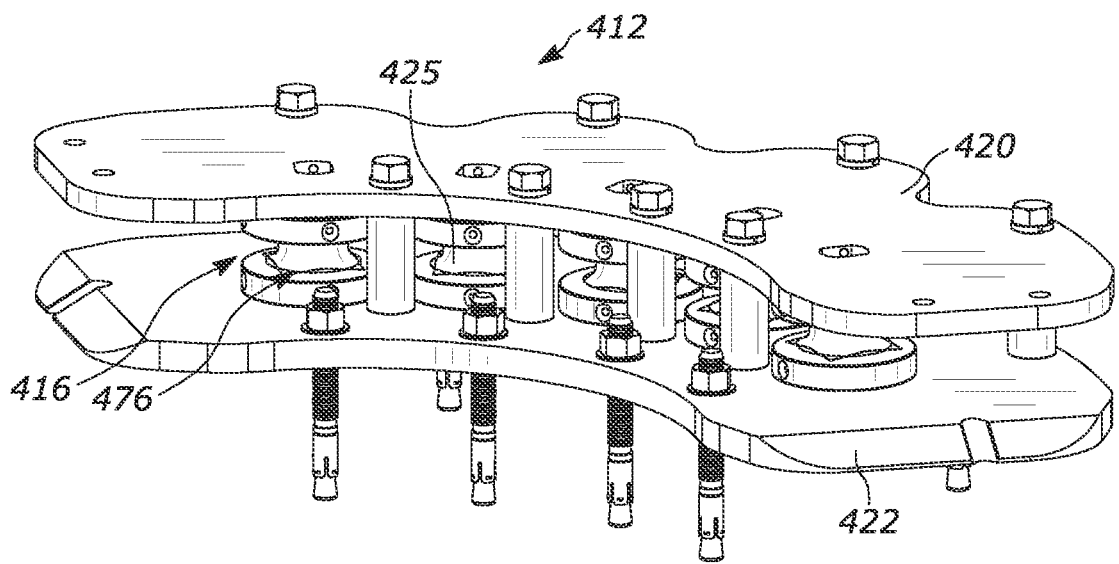
FIG. 21 is a front perspective view of the multi-roller guide of FIG. 20.
Figure 22:
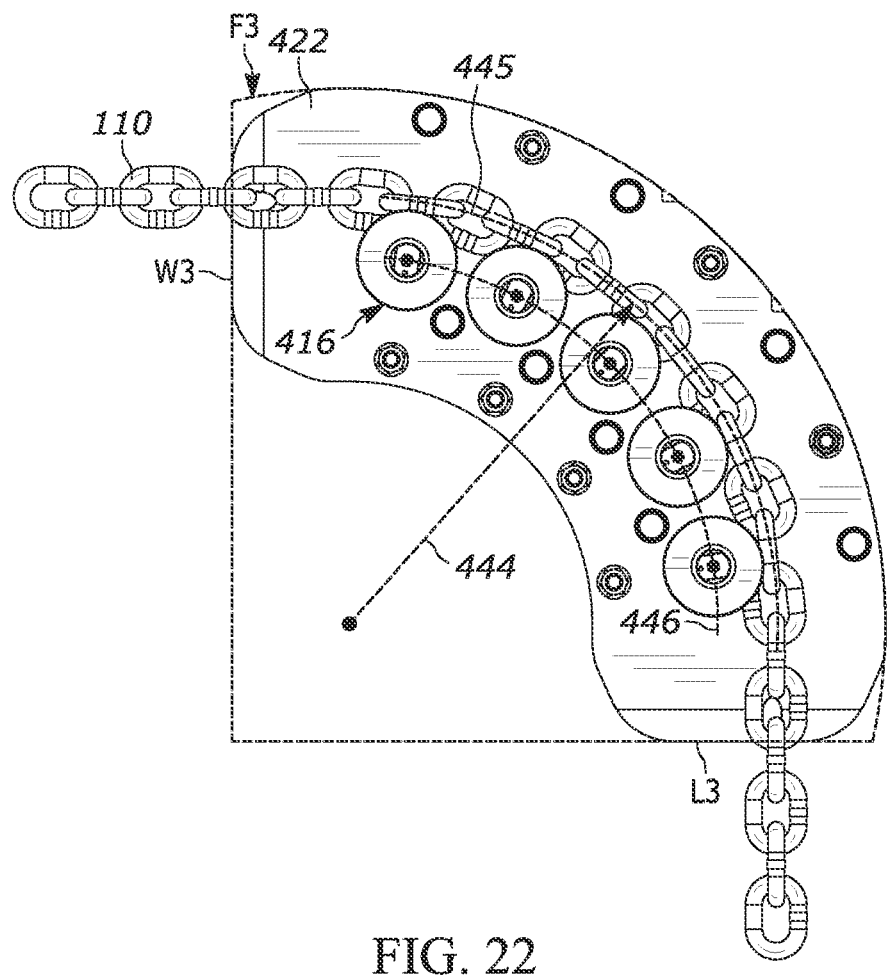
FIG. 22 is a top view of the multi-roller guide of FIG. 20 with the cover plate removed and a tensile member shown engaged therewith.
Figure 23:
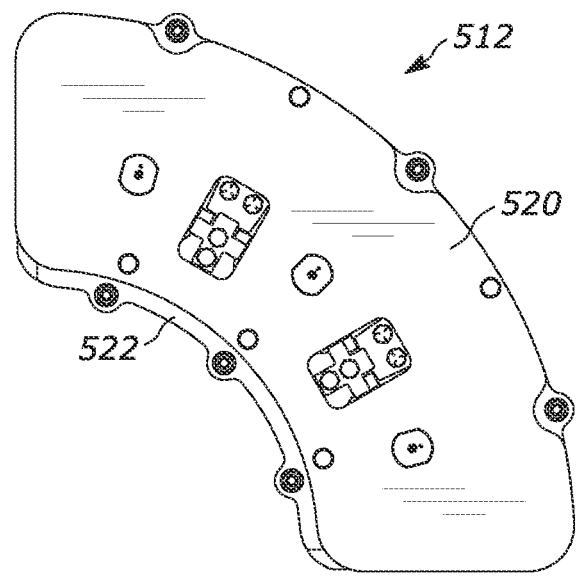
FIG. 23 is a top view of an exemplary fourth embodiment of a multi-roller guide.
Figure 24:
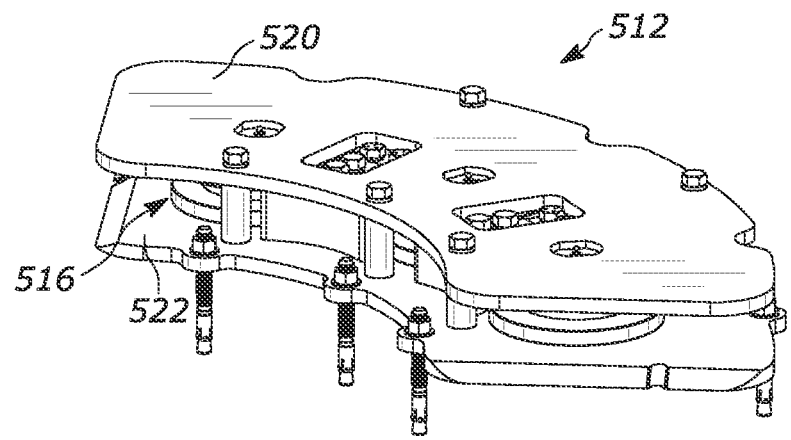
FIG. 24 is a front perspective view of the multi-roller guide of FIG. 23.
Figure 25:
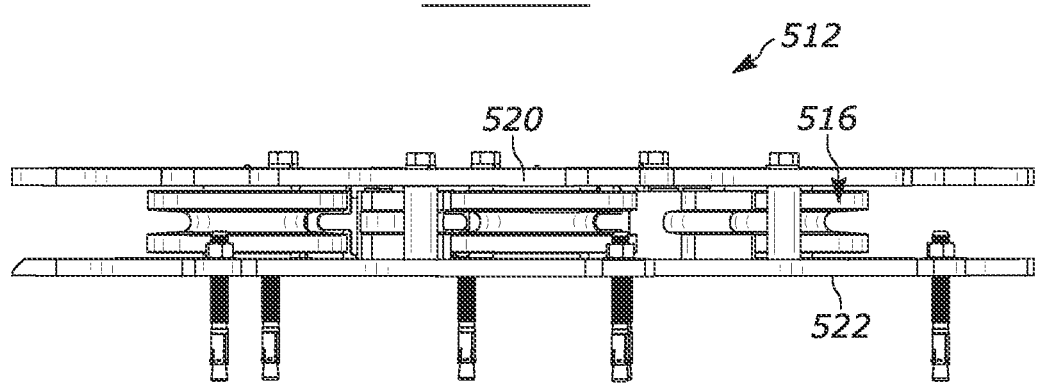
FIG. 25 is a rear view of the multi-roller guide of FIG. 23.
Figure 26:
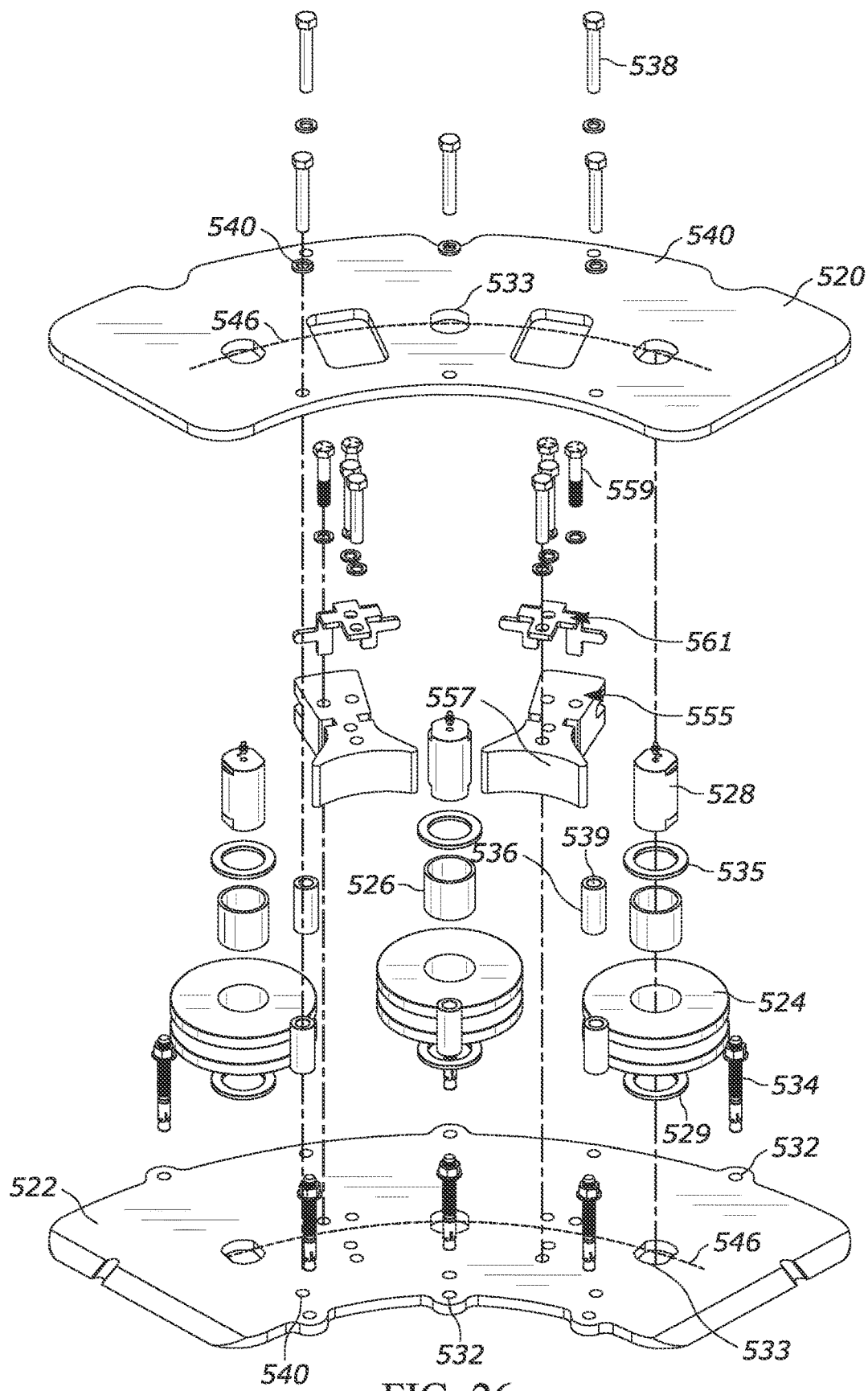
FIG. 26 is an exploded front perspective view of the multi-roller guide of FIG. 23.

Referring now to FIG. 20, an exploded perspective view of an exemplary third embodiment of a multi-roller guide 412 is provided. FIG. 21 provides a top perspective view, and FIG. 22 provides a top view of the multi-roller guide 412 with the cover plate removed and a tensile member 110 shown engaged therewith. The multi-roller guide 412 shares many components with the first embodiment of the multi-roller guide 112, as such, for convenience the components have been numbered similarly using a 400-series number in place of the 100-series number (i.e., spacer 136 and spacer 436, etc.) to indicate in at least some embodiments, at least partly similar form and function. Although some embodiments of the multi-roller guide can include a one-piece roller, the roller 424 of the multi-roller guide 412 can be comprised of several components coupled together. For example, the roller 424 can include an upper roller portion 470 and a lower roller portion 472, each having an outer sidewall 427 and a chamber 474 formed therein.

The roller 424 further includes a core block 476 having opposing core block ends 480 with a center core portion 425 positioned therebetween and a center aperture 478 for receiving the bearing 426 and axle 428 extending therethrough. The core block 476 can take many forms, although in at least some embodiments, the core block 476 is spool shaped with the core block ends 480 having a non-round (e.g., square, octagonal, triangular, etc.) perimeter shape configured to matingly engage the chamber 474 so as to rotate with the roller portions 470, 472 about the bearing 426. The multi-component roller 424 allows for replacement of individual components during repair, such as the upper roller portion 470, core block 476, or lower roller portion 472. The chamber 474 can take many forms, although in at least some embodiments, the chamber 474 is sized and shaped to receive at least a portion of the core block end 480. The roller portions 470, 472 can include set screws and corresponding apertures 484 for securing the roller portions 470 with the block ends 480. In at least some embodiments, two roller assemblies 416 are provided, while in other embodiments, three or more are provided to form a generally arc-shaped configuration (e.g., a roller assembly arc path 446).

The bearing 426 can be comprised of one or more of various materials, such as nylon, brass, steel, etc., and can take any of various forms, such as a roller bearing, a taper bearing, etc. and include various shapes, such as cylindrical. In at least some embodiments, a lower thrust washer 429 and an upper thrust washer (not shown) can be provided between the roller assembly 416 and the base plate 422 and cover plate 420 to space the roller 424 and bearing 426 from either plate.

In at least some embodiments, the axle 428 is generally cylindrical, and can further include a lubrication passage 443. The axles 428 can be fixed to the base plate 422 and the cover plate 420 using fasteners, such as screws, bolts, etc., in addition, in at least some embodiments, the axles 428 can include ends 431 shaped to engage with mating apertures 433 on the base plate 422 and cover plate 420 (e.g. non-round).

A guide bend radius 444 extends from a tensile member arc path 445, which has the same arc as the roller assembly arc path 446. The guide bend radius 444 is the radius of a circle that would follow the tensile member arc path 445, and in at least some embodiments is between about 12 inches and about 14 inches, while in other embodiments, the guide bend radius 444 is greater than about 14 inches or less than about 12 inches. The length L3 and width W3 of the footprint F3. In at least some embodiments, with a guide bend radius 444 of 12 inches, the length L3 and width W3 of the footprint F3 of the multi-roller guide 412 (e.g., FIG. 22) is between about 18 inches and about 20 inches.

Referring to FIGS. 23-26, various views of an exemplary fourth embodiment of a multi-roller guide. The multi-roller guide 512 shares many components with the first embodiment of the multi-roller guide 112, as such, for convenience the components have been numbered similarly using a 500-series number in place of the 100-series number (i.e., spacer 136 and spacer 536, etc.) to indicate at least in some embodiments, at least partially similar form and function.

Figure 32:
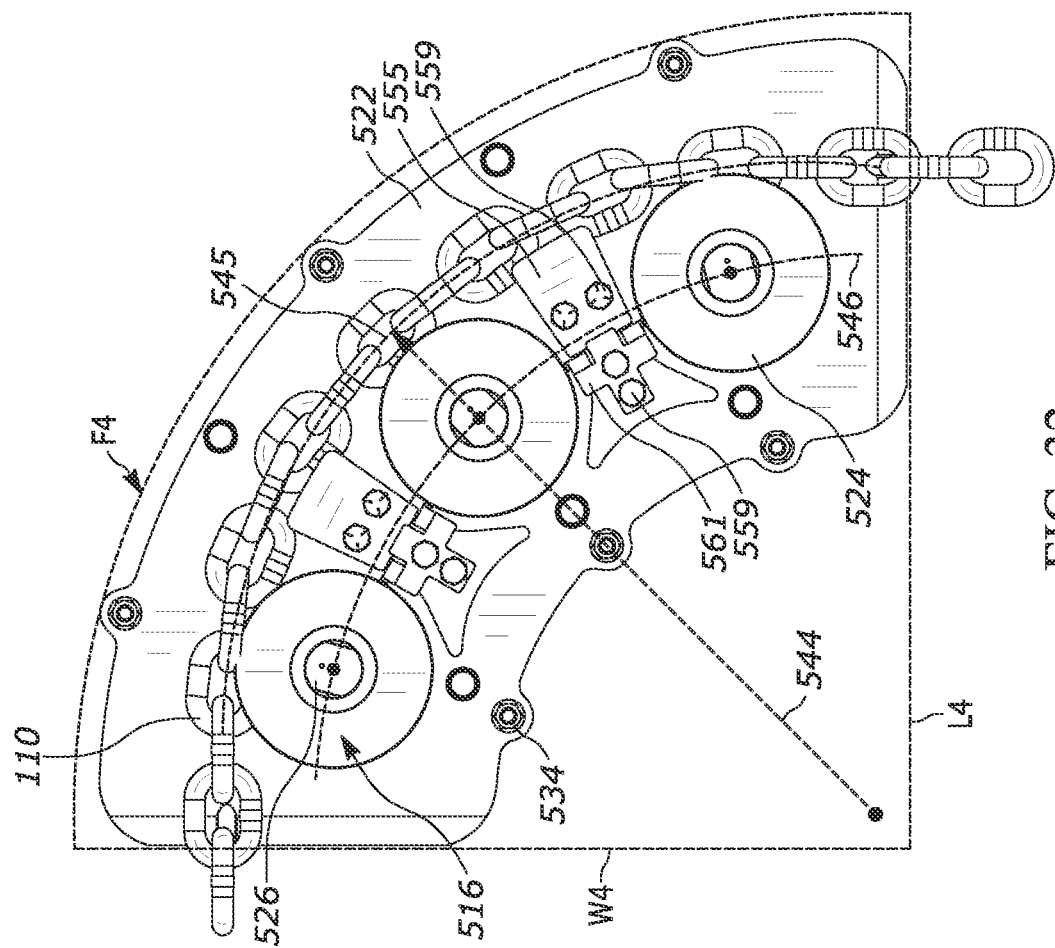
FIG. 32 is a top view of the multi-roller guide of FIG. 23 with the cover plate removed and a tensile member shown engaged therewith.

The exemplary multi-roller guide 512 is generally arc-shaped and includes a plurality of roller assemblies 516, while in other embodiments, the exemplary multi-roller guide 512 can take other shapes. In at least some embodiments, two roller assemblies 516 are provided, while in other embodiments, three or more are provided to form a generally arc-shaped configuration (e.g., a roller assembly arc path 546). In addition, a guide bend radius 544 extends from a tensile member arc path 545, which has the same arc as the roller assembly arc path 546. The guide bend radius 544 is the radius of a circle that would follow the tensile member arc path 545, and in at least some embodiments is between about 20 inches and about 24 inches, while in other embodiments, the guide bend radius 544 is greater than about 24 inches or less than about 20 inches. The length L4 and width W4 of the footprint F4. In at least some embodiments, with a guide bend radius 544 of 20 inches, the length L4 and width W4 of the footprint F4 of the multi-roller guide 512 (e.g., FIG. 32) is between about 23 inches and about 25 inches.

In at least some embodiments, the roller assemblies 516 are secured between a cover plate 520 and a base plate 522. In at least some embodiments, the roller assemblies 516 are secured between a cover plate 520 and a base plate 522. As shown, the cover plate 520 and the base plate 522 can be generally arc-shaped, although other shapes can be utilized. In at least some embodiments, the cover plate 520 includes a plurality of mating apertures 533. The base plate 522 can include a plurality of base securement apertures 532 for receiving base plate fasteners 534 (e.g., bolts, bolts with nuts, etc.) for securement of the multi-roller guide 512 to a surface, such as the floor 104 at a desired corner (or other change of direction in any plane) location. As seen best in FIG. 26, the multi-roller guide 512 can further include a plurality of spacers 536 situated between the base plate 522 and cover plate 520 to provide clearance for the rollers 524 and the tensile member 110 between the base plate 522 and cover plate 520. In at least some embodiments, the spacers 536 are cylindrical, although in other embodiments, other shapes can be provided. Further, in at least some embodiments, the spacers 536 are secured between the cover plate 520 and base plate 522 using a plurality of spacer fasteners 538 that pass through spacer passages 539 in the spacers 536, and spacer apertures 540 in the cover plate 520. The spacer fasteners 538 can include any of numerous types of fasteners, such as bolt and nut combinations, or bolts for coupling with threads in the base plate 522 or cover plate 520.

Figure 28:
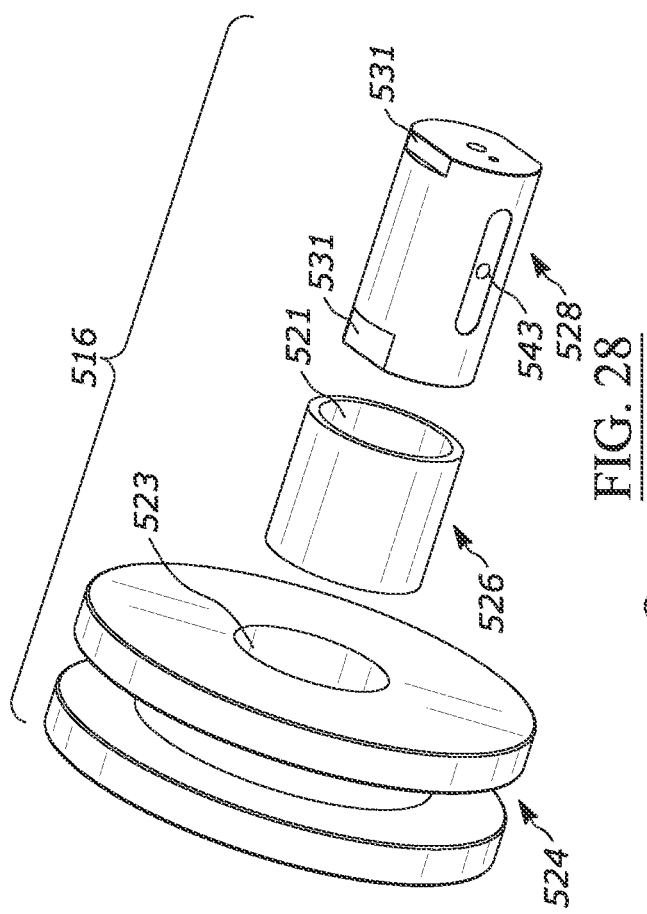
FIG. 28 is an exploded perspective view of the roller assembly of FIG. 28.
Figure 27:
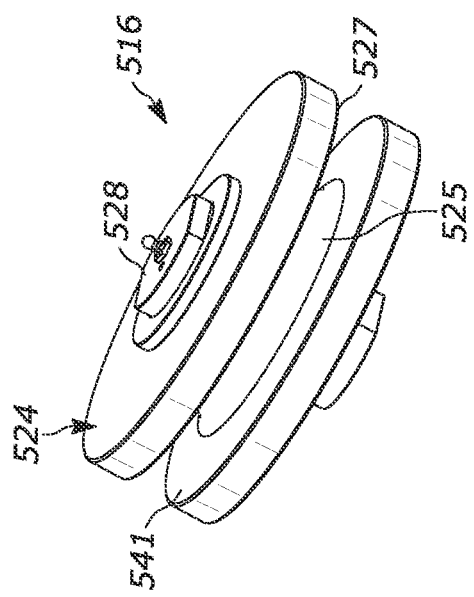
FIG. 27 is a perspective view of an exemplary roller assembly of FIG. 23.

Referring to FIGS. 27 and 28, in at least some embodiments, each roller assembly 516 can include a roller 524 having a roller center passage 523 that receives a bearing 526, with the bearing 526 having a bearing center passage 521 that receives therein an axle 528, wherein the roller assembly 516 is secured between the cover plate 520 and base plate 522 via the axle 528. In some other embodiments, the roller assemblies 516 can be comprised of other components and secured in other manners. In at least some embodiments, the roller 524 can be spool shaped and include a core portion 525 extending between upper and lower boundary walls 527, 541, and in some embodiments, the roller 524 can include sprocket-like tooth profiles configured to engage the tensile member 110 (e.g. such as a transverse ribbed belt).

The bearing 526 can be comprised of one or more of various materials, such as nylon, brass, steel, etc., and can take any of various forms, such as a roller bearing, a taper bearing, etc. and include various shapes, such as cylindrical. In at least some embodiments, a lower thrust washer 529 and an upper thrust washer 535 (FIG. 26) can be provided between the roller assembly 516 and the base plate 522 and cover plate 520 to space the roller 524 and bearing 526 from either plate.

In at least some embodiments, the axle 528 is generally cylindrical, and can further include a lubrication passage 543. The axles 528 can be fixed to the base plate 522 and the cover plate 520 using fasteners, such as screws, bolts, etc., in addition, in at least some embodiments, the axles 528 can include ends 531 shaped to engage with mating apertures 533 on the base plate 522 and cover plate 520 (e.g. non-round). Further, although in the illustrated embodiment, the axle 528 is not configured to rotate, in at least some embodiments of the roller assembly 516, the roller 524 can be fixed to the axle 528, with the axle 528 freely rotatable about one or more bearings within the base plate 522 and cover plate 520.

Figure 30:
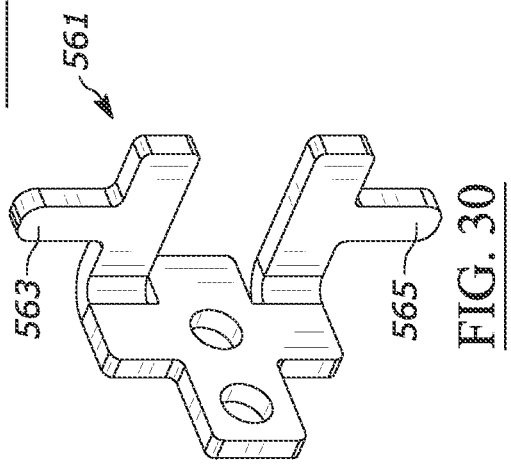
FIG. 30 is a bottom perspective view of an exemplary roller cleaner of FIG. 23.
Figure 29:
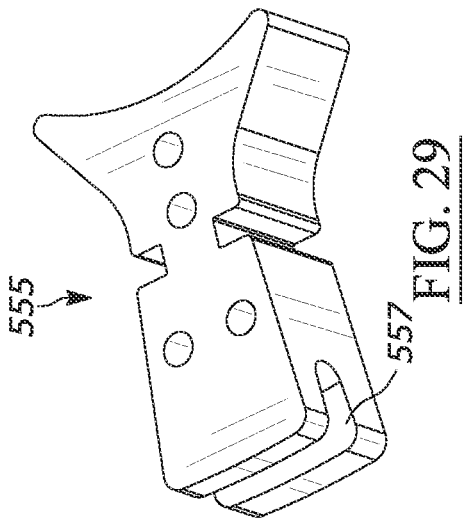
FIG. 29 is a perspective view of an exemplary chain guide of FIG. 23.
Figure 31:
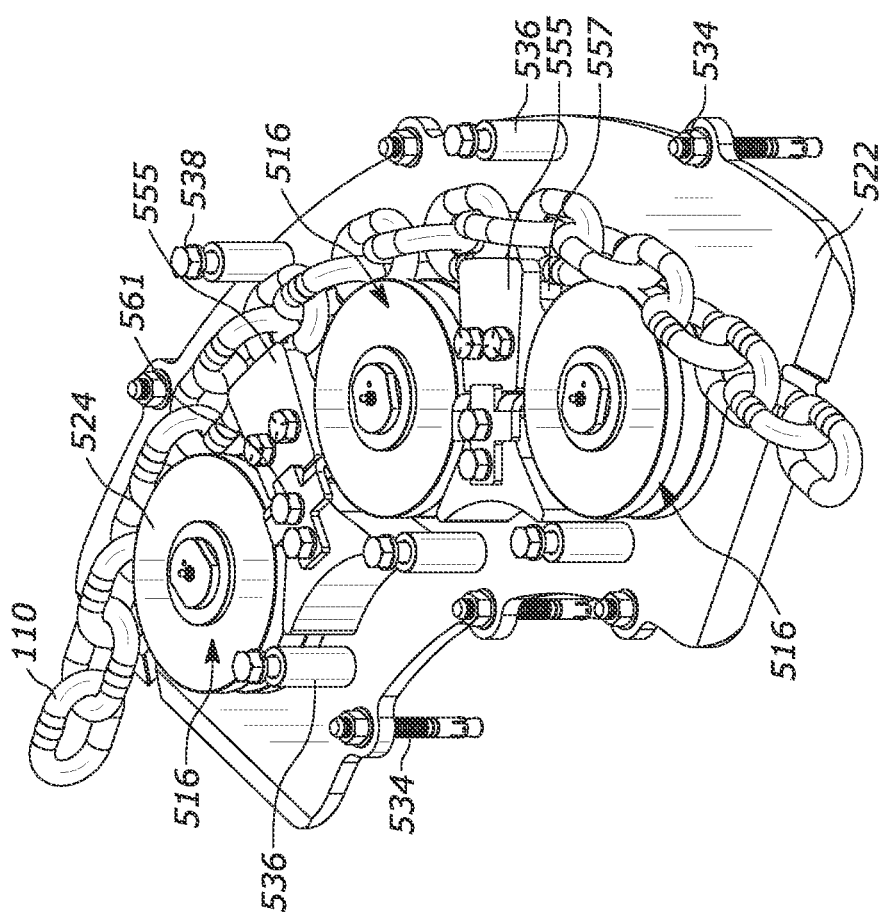
FIG. 31 is a top perspective view of the multi-roller guide of FIG. 23 with the cover plate removed and a tensile member shown engaged therewith.

Referring to FIG. 29, a rear perspective view of an exemplary chain guide 555 is provided. The chain guide 555 can include a chain guide channel 557 shaped and sized receive and guide the tensile member 110 when comprised of a chain. The chain guide 555 is secured to the base plate 522 using one or more chain guide fasteners 559. One or more roller cleaners 561 can be provided and secured atop the chain guides 555 using one or more of the chain guide fasteners 559 (see FIG. 32). As seen in FIG. 30, the roller cleaner 561 can include one or more cleaner arms 563, which are positioned to extend between the upper and lower boundary walls 527, 541 of the core portion 525 of the roller 524. This positioning allows the cleaner arms 563 to rub off debris (manure, bedding, dirt, sand, hay, etc.) collected on the roller 524, which improves the ability of the roller assemblies 516 to effectively operate. FIGS. 30 and 31 provide top perspective and top views of the multi-roller guide 512 with the cover plate 520 removed and the tensile member 110 shown engaged therewith for illustrative purposes.

As noted above, various similar elements are provided with similar names and/or numbers (e.g., spacer 136, 336, 436, 536) and may not be referenced with greater detail, though it should be assumed that absent clarification they in at least some embodiments, may perform a similar function or have an equivalent structure. In addition to the disclosed shapes and sizes (e.g., cylindrical, tubular, conical, tapered, etc.), all the aforementioned components, can vary to include numerous adaptations. Further, the material composition of all components can also include numerous elements, such as steel, aluminum, alloys, plastics, etc. The use of the term "plurality" in the description or claims shall be understood to include "one or more."

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A multi-roller guide comprising:
   a base plate;
   a cover plate;
   a plurality of spacers positioned perpendicularly between the base plate and cover plate;

a plurality of spacer fasteners coupled to the spacers, for securing the base plate and the cover plate to the spacers; and a plurality of roller assemblies secured between the base plate and cover plate, and aligned along a roller assembly arc path;

wherein each of the plurality of roller assemblies includes a roller coupled to a roller bearing, with the roller bearing having a bearing center passage that receives therein an axle, and wherein the plurality of roller assemblies are secured between the cover plate and base plate via the axle; and wherein each roller is spool shaped including a core portion connecting upper and lower boundary walls, the upper and lower boundary walls extending radially outward from the core portion and including a space therebetween for receiving a portion of a tensile member.

2. The multi-roller guide of claim 1, wherein the spacers are cylindrical.

3. The multi-roller guide of claim 1, wherein each respective axle includes a lubrication passage therethrough.

4. The multi-roller guide of claim 1, further comprising a plurality of chain guides secured to at least one of the base plate and cover plate using a plurality of chain guide fasteners.

5. The multi-roller guide of claim 4, wherein each chain guide includes a chain guide channel for receiving and guiding the tensile member.

6. The multi-roller guide of claim 4, wherein the plurality of chain guides are positioned between the plurality of roller assemblies.

7. The multi-roller guide of claim 6, further comprising a plurality of roller cleaners respectively secured atop the plurality of chain guides.

8. The multi-roller guide of claim 7, wherein each roller cleaner includes one or more cleaner arms extending therefrom, wherein the one or more cleaner arms are positioned between the rollers to engage and remove debris.

9. The multi-roller guide of claim 1, wherein the tensile member is secured to one or more floor scrapers, and wherein at least four roller assemblies are coupled with the tensile member to form a loop-shaped circuit.

10. The multi-roller guide of claim 1, wherein the upper and lower boundary walls extend radially perpendicular to a longitudinal center axis of the axle.

11. A multi-roller guide comprising:
a base plate;
a cover plate secured to the base plate; and
a plurality of roller assemblies including rollers rotatably secured between the base plate and cover plate, and aligned along a roller assembly arc path, wherein the rollers are configured to rotatably engage with a tensile member;

wherein each roller further comprises:
an upper roller portion and a lower roller portion, each having an outer sidewall and a respective chamber; and a core block having opposing core block ends with a center core portion positioned therebetween and a center aperture for receiving a bearing and an axle therethrough, wherein the core block ends have a non-round perimeter shape for mating engagement with the respective chambers of the upper roller portion and the lower roller portion, such that the core block is rotationally fixed with the upper roller portion and the lower roller portion.

12. A floor cleaning system having a circuit that includes a tensile member secured to a floor scraper, the system comprising:

at least four multi-roller guides, each multi-roller guide comprising:
a base plate;
a cover plate secured to the base plate via a plurality of spacers and spacer fasteners; and
at least three roller assemblies aligned along a roller assembly arc path, each including a roller rotatably secured between the base plate and cover plate, wherein the rollers of the at least three roller assemblies are configured to rotatably engage with the tensile member to effectuate a change in direction of the tensile member; and
a drive motor assembly operably coupled to the tensile member for moving the tensile member along the rollers within the circuit.

13. The floor cleaning system of claim 12, further comprising a plurality of chain guides secured to at least one of the base plate and cover plate using a plurality of chain guide fasteners.

14. The floor cleaning system of claim 13 wherein each chain guide includes a chain guide channel for receiving and guiding the tensile member.

15. The floor cleaning system of claim 14, wherein the plurality of chain guides are positioned between the plurality of roller assemblies.

16. The floor cleaning system of claim 15, further comprising a plurality of roller cleaners respectively secured atop the plurality of chain guides.

17. The floor cleaning system of claim 16, wherein each roller cleaner includes one or more cleaner arms extending therefrom, wherein the one or more cleaner arms are positioned between the rollers to engage and remove debris situated on rollers.

* * * * *